United States Patent
Kitano

(10) Patent No.: US 8,840,253 B2
(45) Date of Patent: Sep. 23, 2014

(54) LIGHT SOURCE APPARATUS AND IMAGE DISPLAY APPARATUS USING THE SAME

(75) Inventor: Hiroshi Kitano, Hyogo (JP)

(73) Assignee: Panasonic Corporation, Osaka (JP)

( * ) Notice: Subject to any disclaimer, the term of this patent is extended or adjusted under 35 U.S.C. 154(b) by 372 days.

(21) Appl. No.: 13/426,325

(22) Filed: Mar. 21, 2012

(65) Prior Publication Data

US 2012/0242912 A1 Sep. 27, 2012

(30) Foreign Application Priority Data

Mar. 23, 2011 (JP) .................. 2011-063807

(51) Int. Cl.
| | |
|---|---|
| G03B 21/14 | (2006.01) |
| G03B 21/28 | (2006.01) |
| G02B 27/14 | (2006.01) |
| F21V 9/00 | (2006.01) |
| G03B 21/16 | (2006.01) |
| G03B 21/20 | (2006.01) |
| H04N 9/31 | (2006.01) |
| F21S 10/00 | (2006.01) |
| F21V 13/06 | (2006.01) |
| F21V 13/08 | (2006.01) |
| G03B 33/12 | (2006.01) |
| G02B 26/00 | (2006.01) |

(52) U.S. Cl.
CPC .............. H04N 9/3161 (2013.01); G03B 21/16 (2013.01); G03B 21/2073 (2013.01); H04N 9/3111 (2013.01); G03B 21/204 (2013.01); H04N 9/3158 (2013.01); F21S 10/007 (2013.01); F21V 13/06 (2013.01); G03B 21/2066 (2013.01); H04N 9/3114 (2013.01); F21V 13/08 (2013.01); G03B 33/12 (2013.01); F21V 9/00 (2013.01); G03B 21/28 (2013.01); G02B 26/008 (2013.01)

USPC .................. 353/84; 353/96; 353/20; 348/339; 359/634; 362/293

(58) Field of Classification Search
CPC . H04N 9/3111; H04N 9/3161; H04N 9/3114; H04N 9/3158; G03B 21/204; G03B 21/16; G03B 21/2066; G03B 33/12; G03B 21/28; G03B 21/2073; G02B 26/008; F21V 9/00; F21V 13/06; F21V 13/08; F21S 10/007; F21S 10/026
USPC .................. 353/84, 98, 20; 348/339; 359/634; 362/293

See application file for complete search history.

(56) References Cited

U.S. PATENT DOCUMENTS

| 7,547,114 | B2 | 6/2009 | Li et al. | |
|---|---|---|---|---|
| 2002/0105729 | A1* | 8/2002 | Richards et al. | 359/634 |
| 2009/0027631 | A1* | 1/2009 | Liu et al. | 353/84 |

(Continued)

FOREIGN PATENT DOCUMENTS

| JP | 2004-341105 | 12/2004 |
|---|---|---|
| JP | 2009-277516 | 11/2009 |

Primary Examiner — Georgia Y Epps
Assistant Examiner — Magda Cruz
(74) Attorney, Agent, or Firm — Hamre, Schumann, Mueller & Larson, P.C.

(57) ABSTRACT

A light source apparatus includes: an excitation light source including a laser light source; a first wheel that is controlled to rotate, and includes, in a part of a surface thereof to be illuminated by excitation light emitted from the excitation light source, a phosphor layer to be excited by the excitation light; a dichroic mirror that guides fluorescence emitted from the phosphor layer of the first wheel and the excitation light to an illumination optical system; and a second wheel that is controlled to rotate, and includes a dichroic filter that transmits light having a desired wavelength component of each of the fluorescence and the excitation light output from the dichroic mirror.

19 Claims, 12 Drawing Sheets

(56) References Cited

U.S. PATENT DOCUMENTS

| | | | |
|---|---|---|---|
| 2009/0284148 A1* | 11/2009 | Iwanaga | 313/506 |
| 2010/0328616 A1* | 12/2010 | Silverstein et al. | 353/31 |
| 2012/0026472 A1* | 2/2012 | Masuda | 353/85 |
| 2012/0147332 A1* | 6/2012 | Huang | 353/31 |
| 2013/0070205 A1* | 3/2013 | Pan et al. | 353/31 |
| 2013/0088689 A1* | 4/2013 | Lin et al. | 353/31 |

* cited by examiner

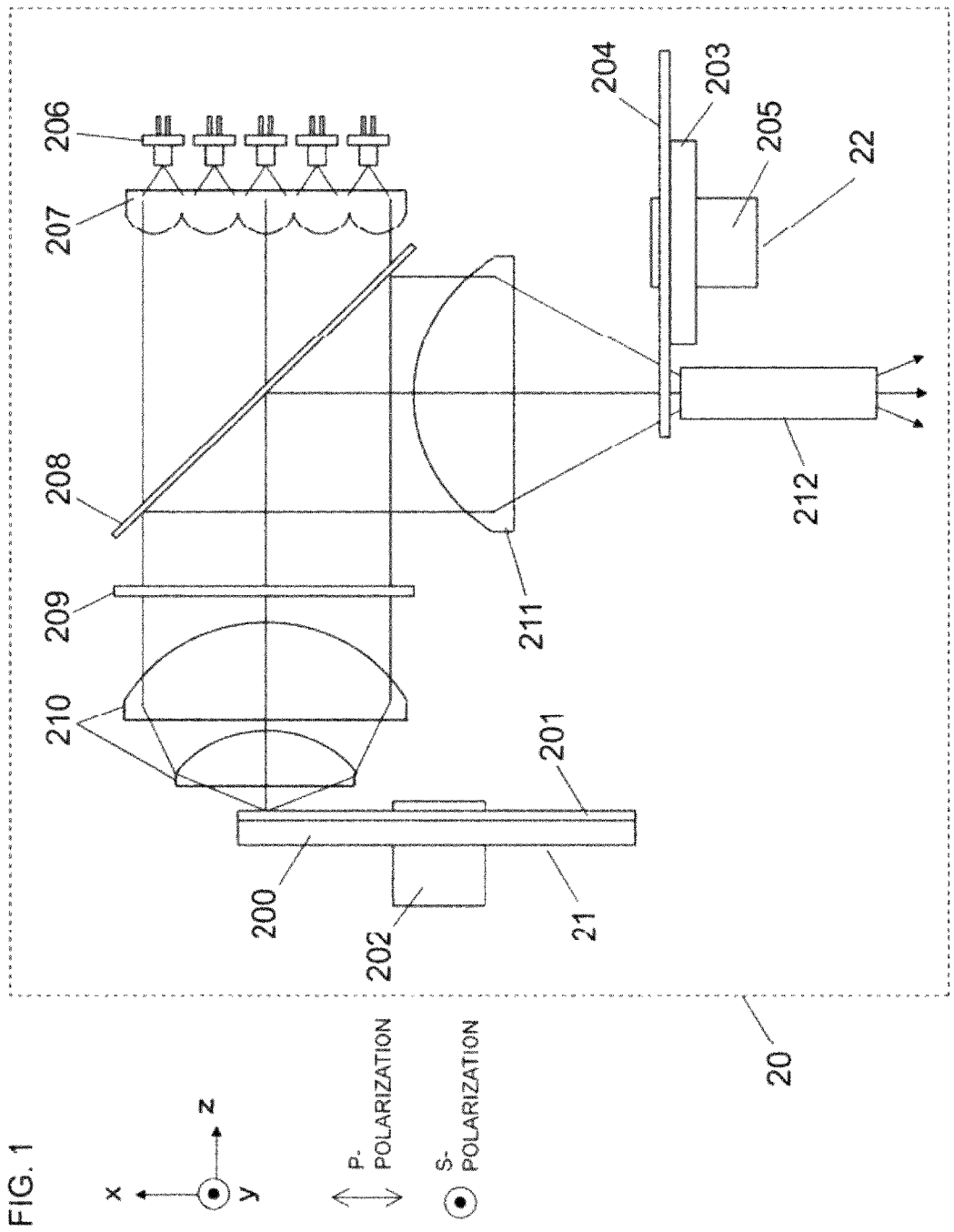

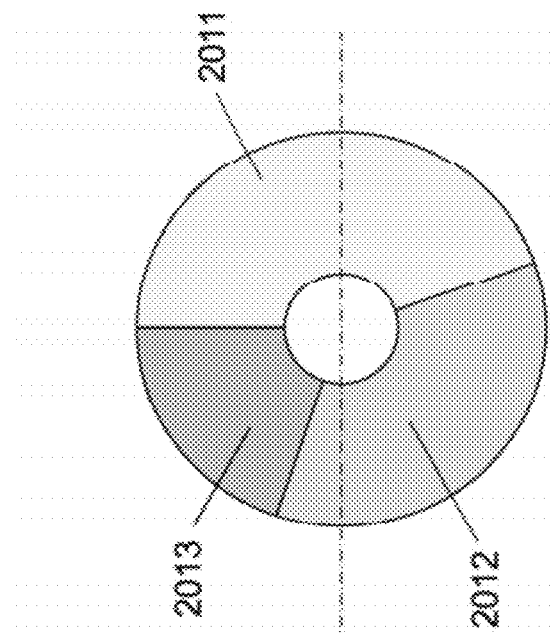
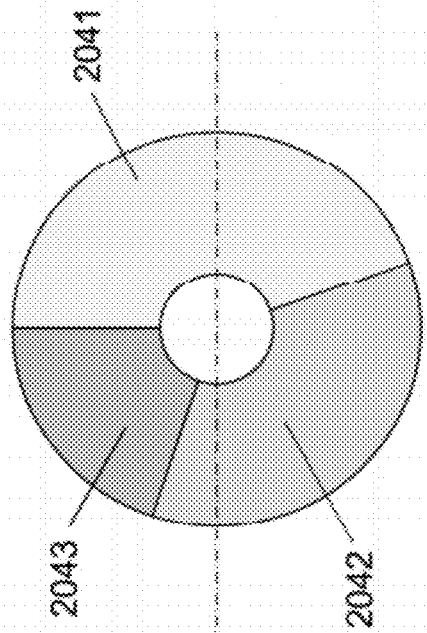
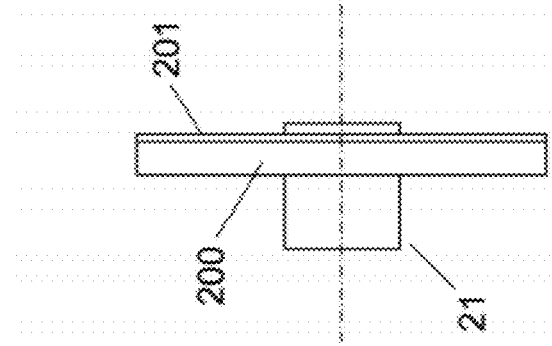
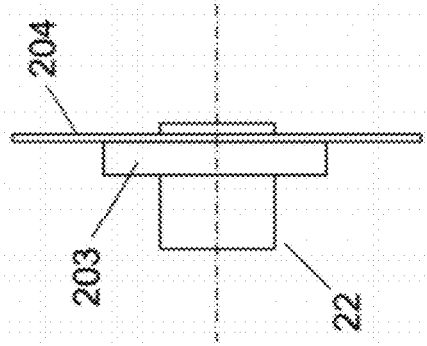
FIG. 2A
FIG. 2B

LIGHT SOURCE APPARATUS AND IMAGE DISPLAY APPARATUS USING THE SAME

BACKGROUND OF THE INVENTION

1. Field of the Invention

The present invention relates to a light source apparatus using a laser light source and phosphors, and in particular, relates to a light source apparatus that emits visible light such as red, green, and blue light, and also to an image display apparatus using the light source apparatus.

2. Description of the Background Art

Today, a projector is widely used as an image display apparatus that projects various video images and the like onto a screen in an enlarged manner. The projector causes a spatial light modulation device, such as a digital micromirror device (DMD) or a liquid crystal display device, to collect the light emitted from a light source, and causes the light modulated with an image signal and emitted from the spatial light modulation device, to be displayed as a color image on the screen.

To obtain a bright large-screen video image in the projector, a high-pressure mercury lamp having a high brightness is used as a light source. The use, however, of a high-pressure mercury lamp as a light source has a problem that mercury is contained, and also causes a problem that a short lifetime of the light source complicates the maintenance.

To solve the problems, a proposal is made for a light source apparatus using a solid light source, such as light-emitting diodes (LED) or lasers, instead of a high-pressure mercury lamp, and also for a new image display apparatus using the light source apparatus.

A laser light source has a longer lifetime than a high-pressure mercury lamp. Further, the laser light emitted from the laser light source is coherent light, which therefore has highly directional properties and a high light-use efficiency. Furthermore, the laser light can ensure a wide color gamut due to its monochromaticity.

Due to its high coherence, however, the laser light causes speckle noise, which results in the deterioration of the image quality. In particular, laser light in the green and yellow wavelength ranges, which has a high luminosity factor for human eye, has a major problem that the image quality deteriorates due to speckle noise.

In contrast, in an LED light source, speckle noise caused by LED light as described above is not very problematic. The present circumstance, however, is that the LED light source has a large emission area and a low light density, which makes it difficult to achieve a high-brightness image display apparatus.

As a solid light source other than the LED light source and the laser light source, a proposal is made for a light source apparatus using LED light or laser light as excitation light to obtain the light emitted from phosphors, and also for an image display apparatus including the light source apparatus.

The use of laser light, which can be densely collected, as excitation light enables the light source apparatus using phosphors to obtain high-brightness light that only requires a small emission area. Further, if laser light is used as excitation light, the fluorescence per se obtained by wavelength conversion is incoherent light, which does not cause speckle noise.

As a conventional technique, a proposal is made for the structure of a light source apparatus where: a phosphor layer is formed on a wheel using a disk-shaped transparent base material; excitation light illuminates the phosphor layer; and fluorescence is obtained in space in the same direction as that of the excitation light source with respect to the surface on which the phosphor layer is formed.

The light source apparatus is intended for use in an image display apparatus, and therefore outputs light in the wavelength regions of three colors, namely red, green, and blue. Further, the light source apparatus has a reflection-type structure where fluorescence is obtained in space in the same direction as that of the excitation light source. This makes it possible to increase the conversion efficiency of excitation light to fluorescence. An LED light source, however, is used as a light source for obtaining red light, which makes it difficult to obtain high-brightness output light.

In addition, in a light source apparatus having a structure using a solid light source, to obtain high-brightness output light suitable for an image display apparatus, it is suitable to obtain green light and red light from fluorescence containing no speckle noise. A conventional method, however, has a problem with the obtaining of a high brightness from fluorescence.

SUMMARY OF THE INVENTION

The present invention is proposed in view of the actual circumstances described above, and it is an object of the present invention to provide a light source apparatus using phosphors that is capable of obtaining output light having a high color purity and a high brightness by a simple method, and provide an image display apparatus using the light source apparatus.

A light source apparatus according to the present invention includes: an excitation light source including a laser light source; a first wheel that is controlled to rotate, includes a phosphor layer to be excited by excitation light emitted from the excitation light source, and reflects fluorescence emitted from the phosphor layer, in a direction from which the excitation light has been incident; a dichroic mirror that is provided between the first wheel and the excitation light source, and guides the fluorescence and the excitation light to an illumination optical system; and a second wheel that is controlled to rotate, is provided between the dichroic mirror and the illumination optical system, and includes a dichroic filter that guides light having a desired wavelength component of each of the fluorescence and the excitation light to the illumination optical system.

In the present invention, the incident direction of excitation light and the emission direction of the fluorescence emitted from a phosphor layer are in space in the same direction with respect to the surface on which the phosphor layer is formed. Such a structure makes it possible to efficiently obtain the fluorescence emitted from the phosphor layer. Here, the state where the incident direction of excitation light and the emission direction of the fluorescence emitted from a phosphor layer are in space in the same direction with respect to the surface on which the phosphor layer is formed, is defined as follows.

It is assumed that in an xyz orthogonal coordinate system, a phosphor layer is formed in a region including the origin $x=y=0$ on the plane $z=0$. An excitation light source is present in the region $z>0$, and excitation light illuminates the point $x=y=z=0$. At this time, the excitation light emitted from the excitation light source and incident on the phosphor layer only needs to be in the region $z>0$, and the xy coordinates of the excitation light source are not particularly limited. The direction in which the fluorescence emitted from the phosphor layer is obtained and emitted is in the region $z>0$.

In the case where the excitation light illuminates, from the direction of $z>0$, the point $x=y=0$ in the thin-film phosphor layer on the plane $z=0$, the intensity of the fluorescence emitted from the phosphor layer has a distribution of light close to Lambertian, which has peaks in the positive z-axis direction and the negative z-axis direction. In this case, however, a larger portion of the fluorescence is emitted to the region z>0. Thus, it is suitable that as in the present invention, the incident direction of excitation light and the emission direction of the fluorescence emitted from the phosphor layer should be in space in the same direction with respect to the surface on which the phosphor layer is formed.

In this case, the excitation light incident on the phosphor layer and the fluorescence emitted from the phosphor layer have traveling directions opposite to each other in the same space. Thus, a dichroic mirror is used to obtain fluorescence as the light output from the light source apparatus. The structure where the dichroic mirror is inclined makes it possible to spatially separate the excitation light incident on the phosphor layer and the fluorescence emitted from the phosphor layer, from each other.

The angle of the light flux incident on the dichroic mirror is not particularly limited, but may be approximately 45 degrees, which is an angle suitable for a simple apparatus structure.

In the present invention, the arrangement is such that the fluorescence spatially separated by the dichroic mirror is made incident on a second wheel on which a dichroic filter is provided.

A color determined by the radiation energy spectrum of the fluorescence emitted from the phosphor layer may be inappropriate for an image display apparatus with its original chromaticity. In response, it is possible to remove an unwanted spectral component by the dichroic filter provided on the second wheel, and perform filtering so as to obtain a light spectrum having a desired chromaticity. Further, the dichroic filter provided on the second wheel also makes it possible to prevent residual excitation light, which has not been wavelength-converted by the phosphor layer, from becoming unnecessarily mixed in the light output from the light source apparatus.

Based on the light source apparatus according to the present invention, the excitation light source is a semiconductor laser light source that oscillates in a blue wavelength region.

The use of blue lasers as the excitation light source makes it possible to efficiently excite green and red phosphors. Further, to obtain blue light as the light output from the light source apparatus, the laser light can be used as it is as the output light, which is suitable for a light source apparatus particularly for an image display apparatus. Specific examples of the emission wavelengths of blue lasers include those from 430 nm to 470 nm.

Based on the light source apparatus according to the present invention, the phosphor layer of the first wheel is divided into three or more segments, and phosphor layers different from each other in type are provided in at least two of the segments and each emit fluorescence having light in a red, yellow, or green wavelength range as a main component. Further, no phosphor layer is provided in at least one of the segments, and a surface of the segment is a mirror surface that reflects the excitation light.

The term "three or more segments" here means the state where the surface on which the phosphor layer is formed on a first wheel that is controlled to rotate is spatially divided into three or more segments having different properties, and in accordance with the rotation control, the spot to be illuminated by the excitation light switches periodically so as to correspond to the number of the divided segments.

It is possible to output light in a plurality of color ranges from a light source apparatus by spatially dividing the first wheel into a plurality of segments so as to form a plurality of phosphor layers. Particularly in a light source apparatus used for an image display apparatus, it is desirable that at least blue light, green light, and red light should be contained as components of the light output from the light source apparatus. It is possible to achieve this by the structure as described above.

In addition, based on the light source apparatus according to the present invention, a polarization conversion device is provided between the first wheel and the dichroic mirror, and changes a polarization direction of the excitation light, and the polarization conversion device is a quarter-wave plate.

In addition, based on the light source apparatus according to the present invention, the excitation light source emits excitation light having, as a main polarization component, P-polarized light with respect to the dichroic mirror; and the dichroic mirror transmits the excitation light from the excitation light source to thereby guide the excitation light to the first wheel, and reflects the light reflected by the first wheel to thereby guide the light to the illumination optical system. Alternatively, the excitation light source emits excitation light having, as a main polarization component, S-polarized light with respect to the dichroic mirror; and the dichroic mirror reflects the excitation light from the excitation light source to thereby guide the excitation light to the first wheel, and transmits the light reflected by the first wheel to thereby guide the light to the illumination optical system.

In addition, based on the light source apparatus according to the present invention, in wavelengths of the excitation light, the dichroic mirror transmits 50% or greater of light having a P-polarization component, and reflects 50% or greater of light having an S-polarization component. In this case, the excitation light source emits excitation light having, as a main polarization component, P-polarized light with respect to the dichroic mirror; and the dichroic mirror transmits the excitation light to thereby guide the excitation light to the first wheel. Alternatively, the excitation light source emits excitation light having, as a main polarization component, S-polarized light with respect to the dichroic mirror; and the dichroic mirror reflects the excitation light to thereby guide the excitation light to the first wheel.

In the dichroic mirror, it is possible to simply obtain, as the light output from the light source apparatus, the excitation light component in the same direction as that of the fluorescence by: selecting the properties of having a high transmission for a P-polarization component and a high reflection for an S-polarization component in the excitation light wavelength; and inserting a polarization conversion device for the excitation light. In this case, the higher transmission the P-polarized light and the higher reflection the S-polarized light in the excitation light wavelength, the more preferred the dichroic mirror.

In the case where P-polarized excitation light is used, the excitation light passes through the dichroic mirror, and passes through the polarization conversion device including a quarter-wave plate, to thereby become converted to circularly-polarized light. Thereafter, the light is reflected by the surface of the first wheel, and subsequently passes through the polarization conversion device again to thereby become converted to S-polarized light. Then, the light is made incident on the dichroic mirror again but reflected by the dichroic mirror this time, and therefore can be obtained as the light output from the light source apparatus.

In the case where S-polarized excitation light is used, the excitation light is reflected by the dichroic mirror, passes back and forth through the polarization conversion device including a quarter-wave plate, to thereby become converted to P-polarized light, and is made incident on the dichroic mirror again. The light passes through the dichroic mirror this time, and therefore can be obtained as the light output from the light source apparatus.

In addition, based on the light source apparatus according to the present invention, the dichroic filter of the second wheel is divided into two or more segments; and the two or more segments are different from each other in spectrum characteristics. Further, the spectrum characteristics include any of a red selectivity, a green selectivity, a blue selectivity, and entire-visible-region transmission properties.

In addition, based on the light source apparatus according to the present invention, at least one of the two or more segments of the second wheel has a function of diffusing the excitation light.

Such a structure makes it possible to, when using the excitation light as it is as a part of the output light, reduce speckle noise by causing the excitation light to pass through a device having the function of diffusing the excitation light.

In addition, based on the light source apparatus according to the present invention, the first wheel and the second wheel are synchronously controlled with the same number of rotations.

Such a structure make is possible to appropriately filter the light spectrum by the dichroic filter provided on the second wheel in accordance with the properties of the light reflected from each segment of the first wheel, and obtain output light having desired chromaticity characteristics in each segment.

In addition, based on the light source apparatus according to the present invention, the first wheel and the second wheel are provided on a rotating body having the same rotating shaft.

Such a structure makes it possible to drive two wheels by the same rotation control means, and therefore achieve a simpler apparatus structure.

In addition, it is possible to configure an image display apparatus including: a light source apparatus; a spatial light modulation device that forms signal light in accordance with a video signal; an illumination optical system that guides the light from the light source apparatus to the spatial light modulation device; and a projection optical system that projects the signal light formed by the spatial light modulation device onto a screen.

The invention makes it possible to achieve a small, bright, and efficient light source apparatus using a long-life and mercury-free solid light source. Further, it is possible to provide an image display apparatus using the light source apparatus.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a structural diagram of a light source apparatus according to a first embodiment;

FIG. 2A is a structural diagram of a first wheel used in the light source apparatus according to the first embodiment;

FIG. 2B is a structural diagram of a second wheel used in the light source apparatus according to the first embodiment;

DESCRIPTION OF THE PREFERRED EMBODIMENTS

Figure 3A:
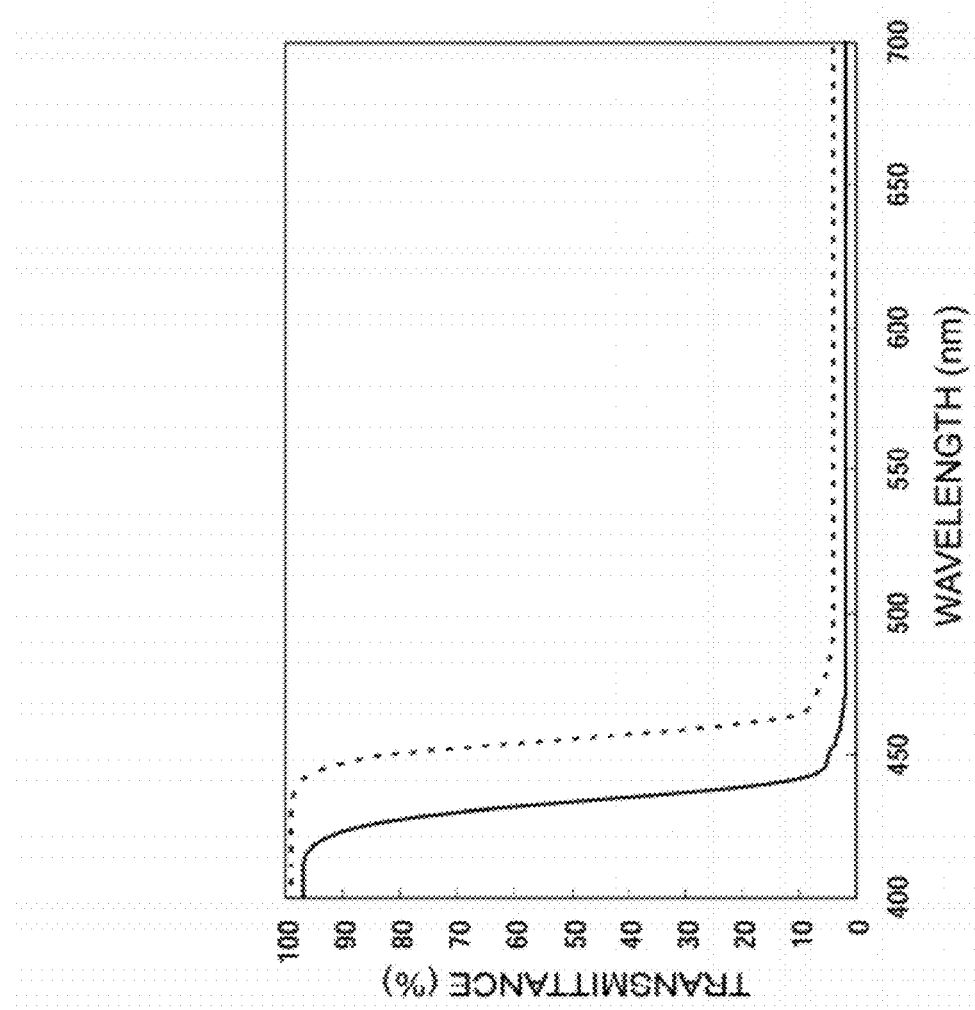
FIG. 3A is a diagram showing the transmission spectra of a dichroic mirror used in the light source apparatus according to the first embodiment at 45-degree incidence.

With reference to the drawings, descriptions are given below of embodiments of a light source apparatus provided by the present invention and an image display apparatus using the same.

<First Embodiment>

FIG. 1 shows the structure of a light source apparatus 20 according to a first embodiment of the present invention.

The light source apparatus 20 according to the first embodiment shown in FIG. 1 includes a first wheel 21, a second wheel 22, an excitation light source 206, a collimating lens array 207, a dichroic mirror 208, a quarter-wave plate 209, light collecting lenses 210 and 211, and a rod integrator 212. The light output from the light source apparatus 20 is formed of light that switches periodically among three time segments, namely red light, green light, and blue light, and the output light can be used as the illumination light of an image display apparatus or the like.

The first wheel 21 includes a substrate 200, a phosphor layer 201, and a rotation control section 202. The substrate 200 is a circular piece of parallel plate glass, and is coated with dichroic coating on the glass surface on one side thereof, the dichroic coating reflecting light in the entire visible light range with a high efficiency. Further, the phosphor layer 201 is formed as a thin film further on the dichroic coating, and emits fluorescence. The rotation control section 202 rotates the substrate 200 in a predetermined direction and at a predetermined speed, in synchronization with the second wheel 22 and the excitation light source 206, which will be described later.

With xyz coordinate axes defined as shown in FIG. 1, in the first wheel 21, the surface of the substrate 200 on which the phosphor layer 201 is formed is parallel to the xy plane so that the first wheel 21 can be rotated by the rotation control section 202 about a rotating shaft parallel to the z-axis. The number of rotations of the first wheel 21 is not particularly limited; however, when the light source apparatus 20 is used for an image display apparatus, the number of rotations is preferably the integral multiple (n=1, 2, ...) of the frame rate of an image signal. Specifically, if the image signal is 60 Hz, examples of the number of rotations include 3600 rpm, 7200 rpm, and 10800 rpm.

FIG. 2A shows an example of a specific segment structure of the first wheel 21.

In the first wheel 21 shown in FIG. 2A, the phosphor layer 201 includes three segments. The three segments are a red phosphor layer 2011 coated with a red phosphor, a green phosphor layer 2012 coated with a green phosphor, and a non-phosphor surface 2013 coated with nothing. The three segments are formed by spatially dividing the 360-degree circumference of the substrate 200 into three parts. In the present embodiment, the angles of division are: 144 degrees for the red phosphor layer 2011; 144 degrees for the green phosphor layer 2012; and 72 degrees for the non-phosphor surface 2013. It is, however, needless to say that the distribution of angles can be appropriately set depending on the wavelength conversion characteristics of the phosphors, the target chromaticity of the output light, or the like.

As will be described later, the substrate 200, on which the phosphor layer 201 is formed, is illuminated by excitation light, but rotates by being driven by the rotation control section 202. This periodically switches the spot to be illuminated by the excitation light, from the red phosphor layer 2011 to the green phosphor layer 2012 to the non-phosphor surface 2013 to the red phosphor layer 2011 again.

A part of the excitation light illuminating the phosphors is wavelength-converted to fluorescence. The light of the fluorescence from the phosphors is emitted essentially equally in all directions. If, however, the substrate is coated with powdered phosphors as a thin film, the light is affected by scattering, and therefore has a distribution of light close to Lambertian, which has a peak in the normal direction of the surface coated with the phosphors.

At this time, the fluorescence converted from the excitation light by the phosphors has its back component (the reflection direction of the fluorescence, i.e., the positive z-direction in FIG. 1) with a relatively high intensity as compared to its forward component (the transmission direction of the fluorescence, i.e., the negative z-direction in FIG. 1). Thus, it is desirable that the fluorescence component should be collected only on the back side in order to efficiently obtain the fluorescence in one direction. To this end, in the present embodiment, to collect the fluorescence only on the back side, a reflecting surface (the dichroic coating) for reflecting the fluorescence is arranged on the side opposite to the excitation light source 206 with respect to the phosphor layer 201 (between the substrate 200 and the phosphor layer 201).

In addition, in the present embodiment, glass is selected as the material of the substrate 200. The phosphors, however, each have the property of reducing its wavelength conversion efficiency when the temperature increases. Thus, the substrate 200 is preferably a highly thermal-conductive material. Accordingly, a surface of a metal base material having aluminum, copper, or both of them as a main component instead of glass may be formed into a mirror surface, and the mirror surface may be coated with the phosphors. A surface finish having a mirror surface can be achieved by cutting and polishing the surface of the metal base material with a high precision. Alternatively, a mirror surface finish may be achieved by forming a metal thin-film layer on the surface of the metal base material by, for example, vapor deposition or plating.

The excitation light source 206 is blue laser diodes that oscillate near a wavelength of about 445 nm, and includes a plurality of laser diodes in order to achieve a high-brightness light source apparatus. The driving scheme of the lasers is continuous wave oscillation, which drives them at a constant current value. In the present embodiment, an example is described where 25 laser diodes are arranged in a matrix of 5×5; however, the number of the laser diodes is not particularly limited, and is appropriately set in accordance with the light intensity of the laser diodes and the intensity of the output light to be obtained from the light source apparatus.

Further, in the present embodiment, the blue laser light source is laser diodes that directly oscillate in the blue wavelength region; however, the excitation light source may only need to be a light source that generates light in short wavelengths near blue wavelengths. The excitation light source can be a blue laser light source based on, for example, the second harmonic generation of infra-red laser light.

The excitation light emitted from the excitation light source 206 is collimated by the collimating lens array 207 including a plurality of lens cells. Each of the blue laser diodes of the excitation light source 206 is arranged so as to correspond to one of the lens cells of the collimating lens array 207. That is, the collimating lens array 207 includes 25 lens cells. In the present embodiment, the collimating lenses are a lens array, but may be independent collimating lenses corresponding to the laser diodes.

The blue laser diodes are adjusted so that the polarization direction of the light emitted from each blue laser diode is in the linear polarization state of the P-polarized light shown in FIG. 1. The dichroic mirror 208 is arranged so as to be inclined 45 degrees with respect to the optical axis of the excitation light. In the wavelength range of the excitation light emitted from the excitation light source 206, the dichroic mirror 208 has the property of having a high transmission for P-polarized light and a high reflection for S-polarized light. In the wavelength ranges of the fluorescence emitted from the red phosphor layer 2011 and the green phosphor layer 2012, the dichroic mirror 208 has the property of having a high reflection regardless of whether P-polarized light or S-polarized light. Consequently, blue laser light, which is the excitation light adjusted to be P-polarized light, passes through the dichroic mirror 208.

FIG. 3A shows the transmission spectra of the dichroic mirror 208 at an incidence angle of 45 degrees.

In FIG. 3A, a solid line indicates the transmittance of S-polarized light, and a dashed line indicates the transmittance of P-polarized light. The dichroic mirror 208 has a high transmission, namely a transmittance of 90% or greater, in the purple wavelength region, and has a high reflection, namely a reflectance of 90% or greater, in the blue and red wavelength regions. As shown in FIG. 3A, the cutoff wavelength of S-polarized light is 434 nm, and the cutoff wavelength of P-polarized light is 456 nm, each cutoff wavelength having a transmittance of 50%. The cutoff wavelength of P-polarized light is about 22 nm longer than that of S-polarized light.

In the present embodiment, the inclination of the dichroic mirror 208 (the angle between the normal vector of the mirror surface and the z-axis) is 45 degrees. Alternatively, the inclination of the dichroic mirror 208 can be greater than 45 degrees in order to increase the difference between the cutoff wavelengths of S-polarized light and P-polarized light.

The excitation light having passed through the dichroic mirror 208 is converted from linearly polarized light, namely P-polarized light, to circularly polarized light by the quarter-wave plate 209, and is collected on the phosphor layer 201 of the first wheel 21 by the light collecting lens 210. The powers of the collimating lens array 207 and the light collecting lens 210 are adjusted so that the entire excitation light emitted from the plurality of blue laser diodes is present in a spot diameter of a certain size or smaller on the phosphor layer 201. In the present embodiment, the adjustments are made so that the assembly of 25 beams of the excitation light has a spot diameter of approximately 2 mm on the phosphor layer 201. In the present embodiment, the light collecting lens 210 includes one group of two lenses. Alternatively, the light collecting lens 210 may include one lens or three or more lenses.

As described above, the spot on the phosphor layer 201 to be illuminated by the excitation light switches periodically among the red phosphor layer 2011, the green phosphor layer 2012, and the non-phosphor surface 2013. Thus, in accordance with this, the light reflected from the phosphor layer 201 switches periodically among the red fluorescence emitted from the red phosphor layer 2011, the green fluorescence emitted from the green phosphor layer 2012, and the excitation light reflected as it is from (the dichroic coating of) the non-phosphor surface 2013, that is, blue laser light.

The type of the green phosphor is not particularly limited, but is desirably a phosphor that efficiently absorbs blue excitation light and efficiently emits green fluorescence, and that is also highly resistant to temperature quenching (a reduction in the light intensity with temperature). In the present embodiment, the green phosphor layer 2012 is $Y_3Al_5O_{12}$:$Ce^{3+}$. Examples, however, of another phosphor capable of obtaining green fluorescence under the excitation of blue laser light having a wavelength of 445 nm include $(Ba,Sr)_2SiO_4$:$Eu^{2+}$, $SrSi_2O_2N_2$:$Eu^{2+}$, $Ba_3Si_6O_{12}N_2$:$Eu^{2+}$, $Sr_3Al_3Si_{13}N_{23}$:$E^{2+}$, and β-SiAlON:$Eu^{2+}$.

In addition, the type of the red phosphor is not particularly limited, but, similarly to the green phosphor, is desirably a phosphor that efficiently absorbs blue excitation light and efficiently emits red fluorescence, and that is also highly resistant to temperature quenching. In the present embodiment, the red phosphor layer 2011 is $CaAlSiN_3$:$Eu^{2+}$. Examples, however, of another phosphor capable of obtaining red fluorescence under the excitation of blue laser light having a wavelength of 445 nm include $Sr_2Si_5N_8$:$Eu^{2+}$ and $SrAlSi_4N_7$:$Eu^{2+}$.

It is, however, needless to say that the above phosphors are merely examples of the phosphors for obtaining light in the red and green wavelength ranges, and do not limit phosphors applicable to the present invention.

The method of producing the phosphor thin film is not particularly limited either. Examples, however, of the method include precipitation methods, printing methods, and molding methods. Further, an appropriate thickness of the phosphor layer is not particularly limited either, because it varies depending on the types of the phosphors to be applied or the method of applying the phosphors. The average thickness of the phosphor layer, however, is preferably one time the average particle diameter of the phosphor powders or greater. If the thickness of the phosphor layer is too small, the volume of the phosphors that contribute to wavelength conversion is insufficient, which makes it difficult to obtain a high wavelength conversion efficiency.

In addition, the excitation light is not limited to blue laser light near a wavelength of 445 nm. If, however, the excitation light is used as it is as blue output light, preferred examples of the wavelength of the excitation light include those of from 430 to 470 nm, taking into account the color rendering properties of the excitation light and the excitation efficiencies of the phosphors.

The light collecting lens 210, which collects the excitation light, acts as a collimating lens for the fluorescence of the respective colors emitted from the red phosphor layer 2011 and the green phosphor layer 2012. The fluorescence of each color effectively obtained and collimated by the light collecting lens 210 passes through the quarter-wave plate 209, and is subsequently made incident on the dichroic mirror 208. Then, the fluorescence of each color is reflected in the direction of the light collecting lens 211 by the dichroic mirror 208, and is collected by the light collecting lens 211.

Meanwhile, the excitation light reflected as it is from the non-phosphor surface 2013 in the phosphor layer 201 is collimated by the light collecting lens 210, subsequently passes through the quarter-wave plate 209 to be thereby adjusted to be S-polarized light, and is then made incident on the dichroic mirror 208. The S-polarized excitation light is reflected in the direction of the light collecting lens 211 by the dichroic mirror 208 this time, and is collected by the light collecting lens 211.

Each of the red fluorescence, the green fluorescence, and the blue laser light (unconverted excitation light) that have been collected by the light collecting lens 211 passes through a dichroic filter 204 provided on the second wheel 22, and is coupled to the rod integrator 212 to thereby serve as the light output from the light source apparatus 20.

The second wheel 22 includes a substrate 203, a dichroic filter 204, and a rotation control section 205. The substrate 203 is a circular flat metal plate, and the dichroic filter 204 is arranged on one side of the substrate 203, the dichroic filter 204 including transparent glass coated with dichroic coating.

In the second wheel 22, the surface of the substrate 203 on which the dichroic filter 204 is arranged is parallel to the yz plane so that the second wheel 22 can be rotated by the rotation control section 205 about a rotating shaft parallel to the x-axis. The number of rotations of the second wheel 22 is adjusted to be the same as that of the first wheel 21.

FIG. 2B shows an example of a specific segment structure of the second wheel.

In the second wheel 22 shown in FIG. 2B, the dichroic filter 204 includes three segments. The three segments are a red selection filter 2041, a green selection filter 2042, and a blue selection filter 2043. The three segments are formed by spatially dividing the 360-degree circumference of the substrate 203 into three parts.

Figure 4:
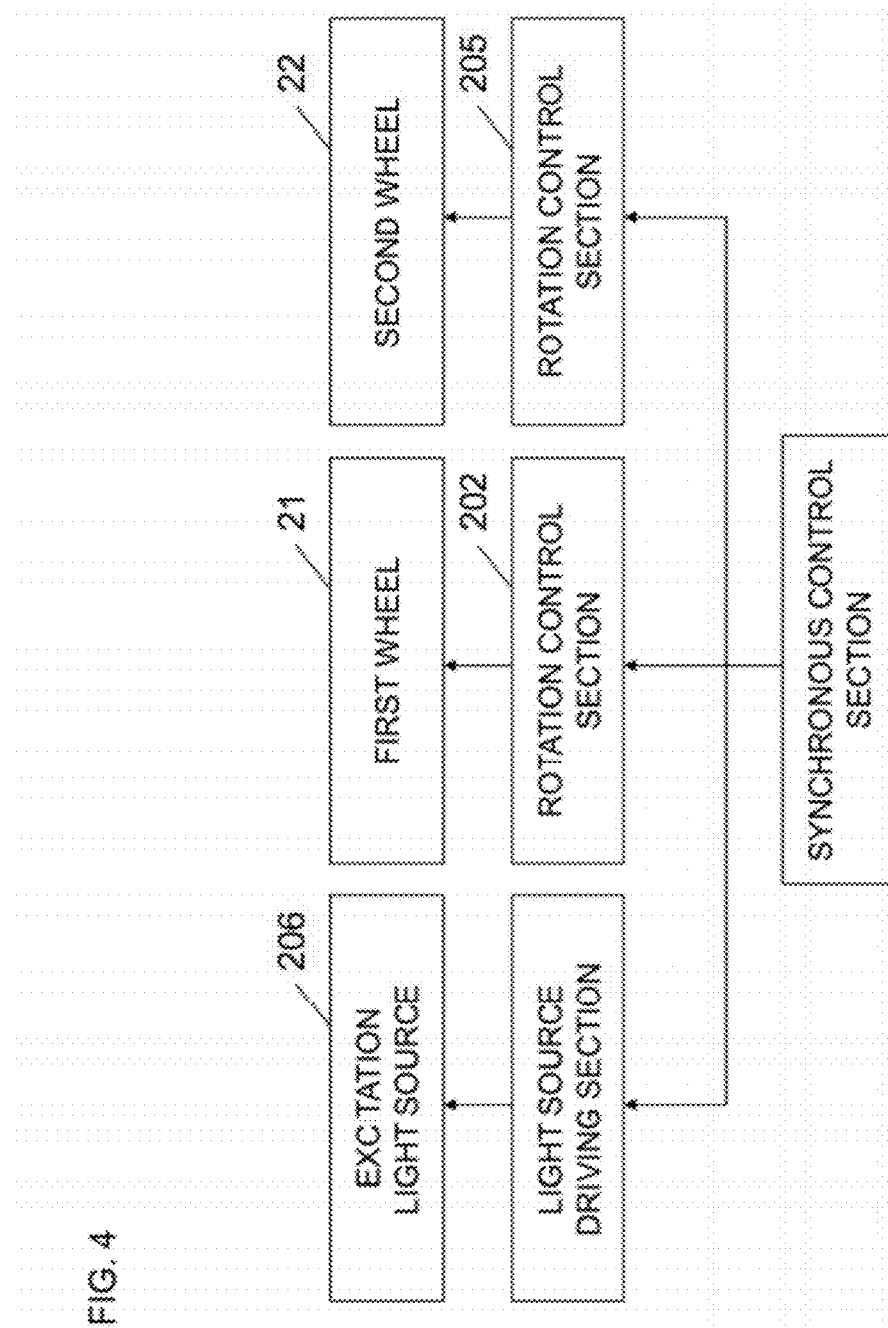
FIG. 4 is a diagram showing an exemplified structure for synchronously controlling the light source apparatus according to the first embodiment.

Here, the rotation control sections of both wheels are synchronously adjusted so that in the time domain (hereinafter referred to as a "red segment") where the excitation light illuminates the red phosphor layer 2011 in the phosphor layer 201 of the first wheel 21, the light collected by the light collecting lens 211 passes through the red selection filter 2041 of the dichroic filter 204 on the second wheel 22. Similarly, the rotation control sections of both wheels are synchronously adjusted so that: in the time domain (hereinafter referred to as a "green segment") where the excitation light illuminates the green phosphor layer 2012, the collected light passes through the green selection filter 2042; and in the time domain (hereinafter referred to as a "blue segment") where the excitation light illuminates the non-phosphor surface 2013, the collected light passes through the blue selection filter 2043. It is possible to achieve these synchronous adjustments as a result of, as shown in FIG. 4, a synchronous control section included in the light source apparatus 20 collectively controlling: a light source driving section that drives the excitation light source 206; the rotation control section 202 that rotates the first wheel 21; and the rotation control section 205 that rotates the second wheel 22. As a matter of course, when the light source apparatus 20 is used for an image display apparatus, the synchronous control section is synchronized with a DMD included in the image display apparatus.

That is, from a hardware point of view, the angles of division in the dichroic filter 204 correspond to the angles of division of the respective segments in the phosphor layer 201 on the first wheel 21 such that: the angle of division of the red selection filter 2041 is designed to be the same as that of the red phosphor layer 2011; the angle of division of the green selection filter 2042 is designed to be the same as that of the green phosphor layer 2012; and the angle of division of the blue selection filter 2043 is designed to be the same as that of the non-phosphor surface 2013. From a software point of view, the rotation phase difference between the first wheel 21 and the second wheel 22 and the speeds of the first wheel 21 and the second wheel 22 are adjusted by the rotation control section 205 so that: the red fluorescence reflected from the red phosphor layer 2011 always illuminates the red selection filter 2041; the green fluorescence reflected from the green phosphor layer 2012 always illuminates the green selection filter 2042; and the blue laser light reflected from the non-phosphor surface 2013 always illuminates the blue selection filter 2043.

Figure 3B:
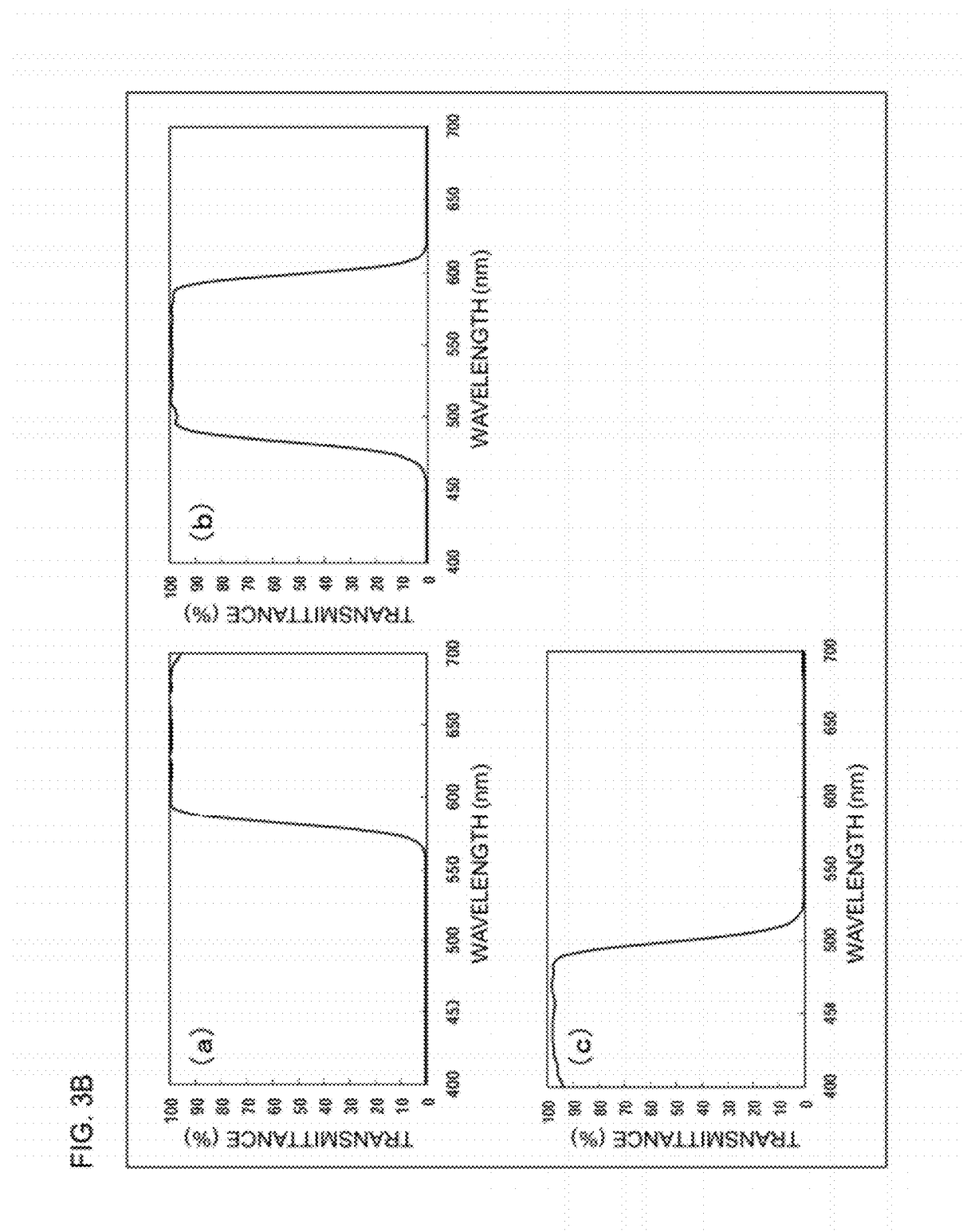
FIG. 3B is a diagram showing the transmission spectra of a dichroic filter used in the light source apparatus according to the first embodiment at 0-degree incidence.

FIG. 3B shows the transmission spectra in the visible region of the selection filters of the colors used in the present embodiment at 0-degree incidence (perpendicular incidence on the mirror).

First, (a) of FIG. 3B shows the transmission spectrum of the red selection filter 2041. The cutoff wavelength (transmittance=50%) is about 580 nm, and the red selection filter 2041 has the property of having a high transmission on the longer wavelength side than the cutoff wavelength, and a high reflection on the shorter wavelength side. Next, (b) of FIG. 3B shows the transmission spectrum of the green selection filter 2042. The cutoff wavelengths are about 480 nm and about 600 nm, and only light in the wavelength range between both cutoff wavelengths has a high transmission. Finally, (c) of FIG. 3B shows the transmission spectrum of the blue selection filter 2043. The cutoff wavelength (transmittance=50%) is about 500 nm, and the blue selection filter 2043 has the property of having a high transmission on the shorter wavelength side than the cutoff wavelength, and a high reflection on the longer wavelength side. In the blue segment in the present embodiment, however, the light incident on the dichroic filter 204 contains only blue laser light. Thus, the blue selection filter 2043 may be transparent glass coated with antireflection coating that achieves a high transmission in the entire visible region.

A description is given below of the effect of the use of the second wheel 22.

In the wavelength conversion by each phosphor, not the entire excitation light is converted to fluorescence, and a part of the excitation light remains as unconverted light. The unconverted excitation light is forward-scattered and back-scattered by the phosphor layer 201. At this time, the forward-scattered light emitted into the space $z \leq 0$ is reflected by the dichroic-coated surface, and results in joining the back-scattered component in the space $z \geq 0$. Then, the resulting light is made incident on the light collecting lens 210 again.

The unconverted excitation light effectively obtained and collimated by the light collecting lens 210 passes through the quarter-wave plate 209, and is subsequently made incident on the dichroic mirror 208.

The unconverted excitation light obtained as back-scattered light has been scattered by the phosphor layer 201, and therefore the polarization state of the unconverted excitation light is disturbed relative to the light incident on the phosphors. However, residual excitation light, which is incident on the dichroic mirror 208 again, contains light having an S-polarization component. Thus, the part of the residual excitation light that has the S-polarization component is reflected toward the light collecting lens 211 by the dichroic mirror 208.

That is, with the apparatus structure employed in the present embodiment, in the red segment and the green segment, a luminous flux passing through the light collecting lens 211 contains not only the fluorescence obtained by the conversion by each phosphor layer, but also blue laser light.

If, however, the luminous flux contains blue laser light in the red segment and the green segment, the color purity of each segment decreases. This results in light having poor color rendering properties when the light source apparatus is used for an image display apparatus. In response, in the red segment and the green segment, it is effective to provide a dichroic filter having the property of removing blue laser light. The present invention focusing on this technique, the present embodiment obtains output light having a high color purity by arranging the dichroic filter 204 described above on the second wheel 22.

In addition, the green phosphor $Y_3Al_5O_{12}:Ce^{3+}$ used in the present embodiment is a phosphor having excellent properties to obtain high-brightness light. The fluorescence spectrum, however, is a relatively wide band, which results in an insufficient purity of green in view of color rendering properties. To represent the chromaticity of the fluorescence spectrum by an xy chromaticity coordinate system, $(x, y)=(0.356, 0.583)$.

Such a chromaticity, however, is improved by removing fluorescence components on the longer wavelength side from all the fluorescence components. As a result, if light passes through the green selection filter 2042 having the properties shown in (b) of FIG. 3B, the chromaticity is improved such that $(x, y)=(0.330, 0.620)$, which is a chromaticity of green light suitable for an image display apparatus. That is, it is desirable that in the green segment, red light in a wavelength range of 600 nm or greater should be removed in order to ensure the color purity of green light.

In contrast, in the red segment, the output light has light in a wavelength range of 600 nm or greater as a main component. Thus, the filtering properties in the green segment cannot be applied to the output light in the red segment. That is, it is necessary to change filtering properties between the red segment and the green segment. In response, it is suitable to switch filtering properties over time, using the second wheel 22 provided with the dichroic filter 204 including the plurality of segments as described in the present invention.

It should be noted that in the present embodiment, the case is described where green fluorescence is obtained as the output light, using blue laser light as the excitation light source; however, the wavelength ranges of the excitation light and the fluorescence are not particularly limited, and can be appropriately selected in accordance with the purpose.

As described above, the employment of the structure according to the first embodiment makes it possible to provide a small light source apparatus capable of obtaining visible light having high color rendering properties and a high brightness by a simple method. In particular, the use of the second wheel 22 makes it possible to obtain output light having a high color purity and not containing unwanted light in each segment.

<Second Embodiment>

Figure 5:
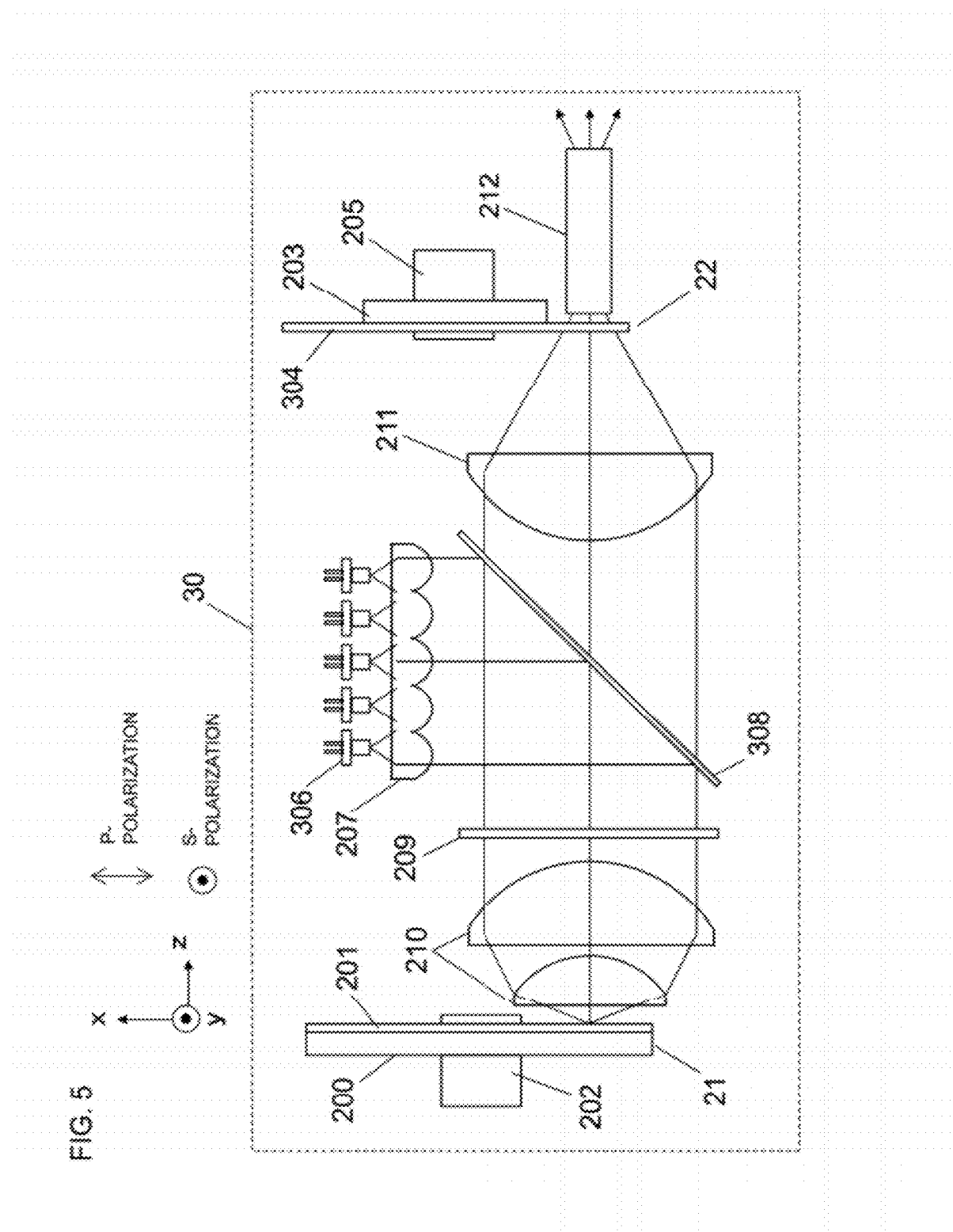
FIG. 5 is a structural diagram of a light source apparatus according to a second embodiment.

FIG. 5 shows the structure of a light source apparatus 30 according to a second embodiment of the present invention.

The light source apparatus 30 according to the second embodiment shown in FIG. 5 includes a first wheel 21, a second wheel 22, an excitation light source 306, a collimating lens array 207, a dichroic mirror 308, a quarter-wave plate 209, light collecting lenses 210 and 211, and a rod integrator 212. Similarly to the first embodiment, the light output from the light source apparatus 30 is formed of light that switches periodically among three time segments, namely red light, green light, and blue light, and the output light can be used as the illumination light of an image display apparatus or the like.

The light source apparatus 30 according to the second embodiment is different from the light source apparatus 20 according to the first embodiment described above in the excitation light source 306 and the dichroic mirror 308. Further, in accordance with the properties of these different components, also the arrangement of some components of the light source apparatus 30 is different from that of the light source apparatus 20. It should be noted that in the light source apparatus 30, the same components as those of the light source apparatus 20 are denoted by the same reference numerals, and are not redundantly described.

Similarly to the excitation light source 206 employed in the first embodiment, the excitation light source 306 employed in the second embodiment has a structure where 25 blue laser diodes are arranged in a matrix. The emitted light, however, is adjusted to be S-polarized light. The dichroic mirror 308 is arranged so as to be inclined 45 degrees with respect to the optical axis of the excitation light. In the wavelength range of the excitation light emitted from the excitation light source 306, the dichroic mirror 308 has the property of having a high transmission for P-polarized light and a high reflection for S-polarized light. In the wavelength ranges of the fluorescence emitted from the phosphor layer 201 of the first wheel 21, the dichroic mirror 308 has the property of having a high transmission regardless of whether P-polarized light or S-polarized light.

Figure 6:
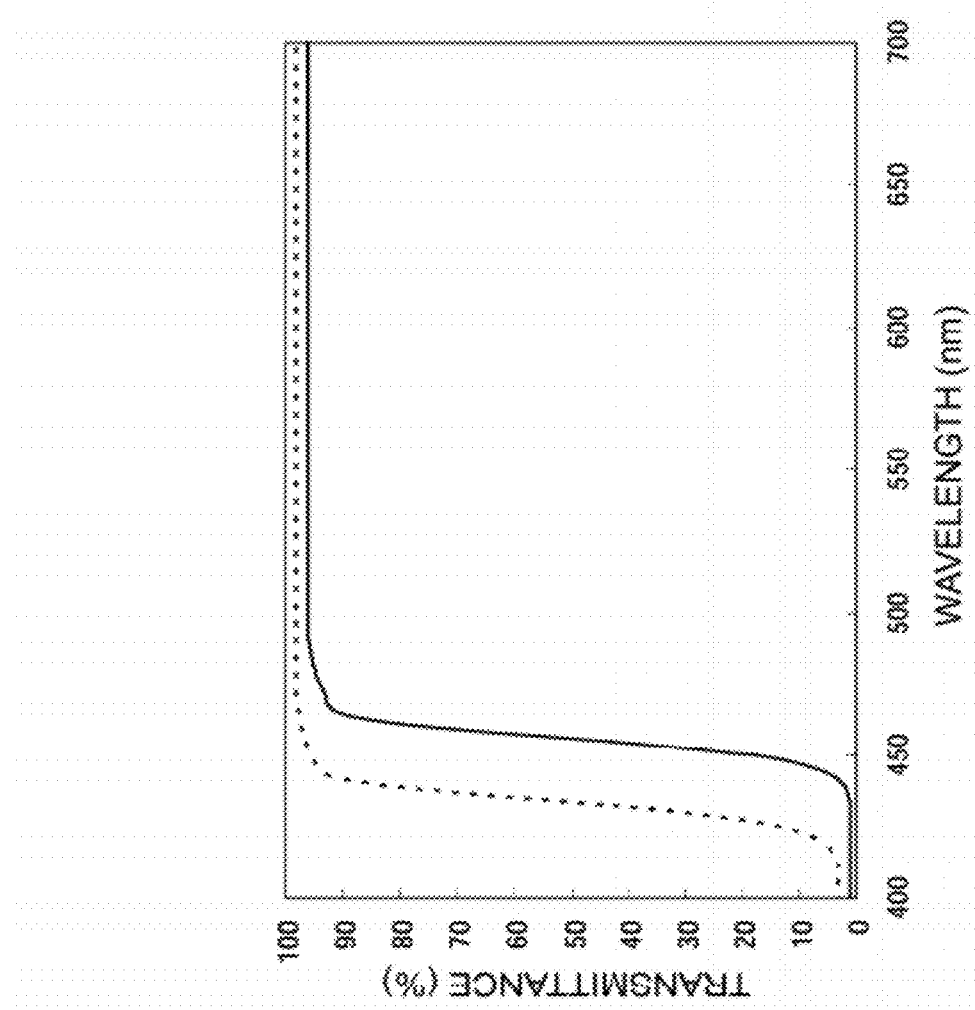
FIG. 6 is a diagram showing the transmission spectra of a dichroic mirror used in the light source apparatus according to the second embodiment at 45-degree incidence.

The dichroic mirror 308 employed in the second embodiment is different from the dichroic mirror 208 employed in the first embodiment in transmission spectrum characteristics. FIG. 6 shows the transmission spectra of the dichroic mirror 308 at an incidence angle of 45 degrees. Of the two plots in FIG. 6, a solid line indicates the transmittance of S-polarized light, and a dashed line indicates the transmittance of P-polarized light.

The dichroic mirror 308 has a high reflection, namely a reflectance of 90% or greater, in the purple and blue wavelength regions, and has a high transmission, namely a transmittance of 90% or greater, in the blue and red wavelength regions. As shown in FIG. 6, the cutoff wavelength of S-polarized light is 456 nm, and the cutoff wavelength of P-polarized light is 434 nm, each cutoff wavelength having a transmittance of 50%. The cutoff wavelength of P-polarized light is about 22 nm shorter than that of S-polarized light.

The excitation light incident on the dichroic mirror 308 at an angle of 45 degrees is reflected perpendicularly, and is collected on the phosphor layer 201 of the first wheel 21. The fluorescence emitted from the phosphor layer 201 passes through the dichroic mirror 308, subsequently passes through the dichroic filter 204, and is coupled to the rod integrator 212 to thereby serve as the light output from the light source apparatus 30.

As described above, the employment of the structure according to the second embodiment makes it possible to provide a small light source apparatus capable of obtaining visible light having a high brightness and a high color purity even by a simple method. In particular, the use of the second wheel 22 makes it possible to obtain output light having a high color purity and not containing unwanted light in each segment. Further, the light output from the light source apparatus 30 according to the second embodiment is equivalent to the light output from the light source apparatus 20 according to the first embodiment. This makes it possible to select the more appropriate form in view of, for example, restrictions on the arrangement of the components.

<Third Embodiment>

Figure 7:
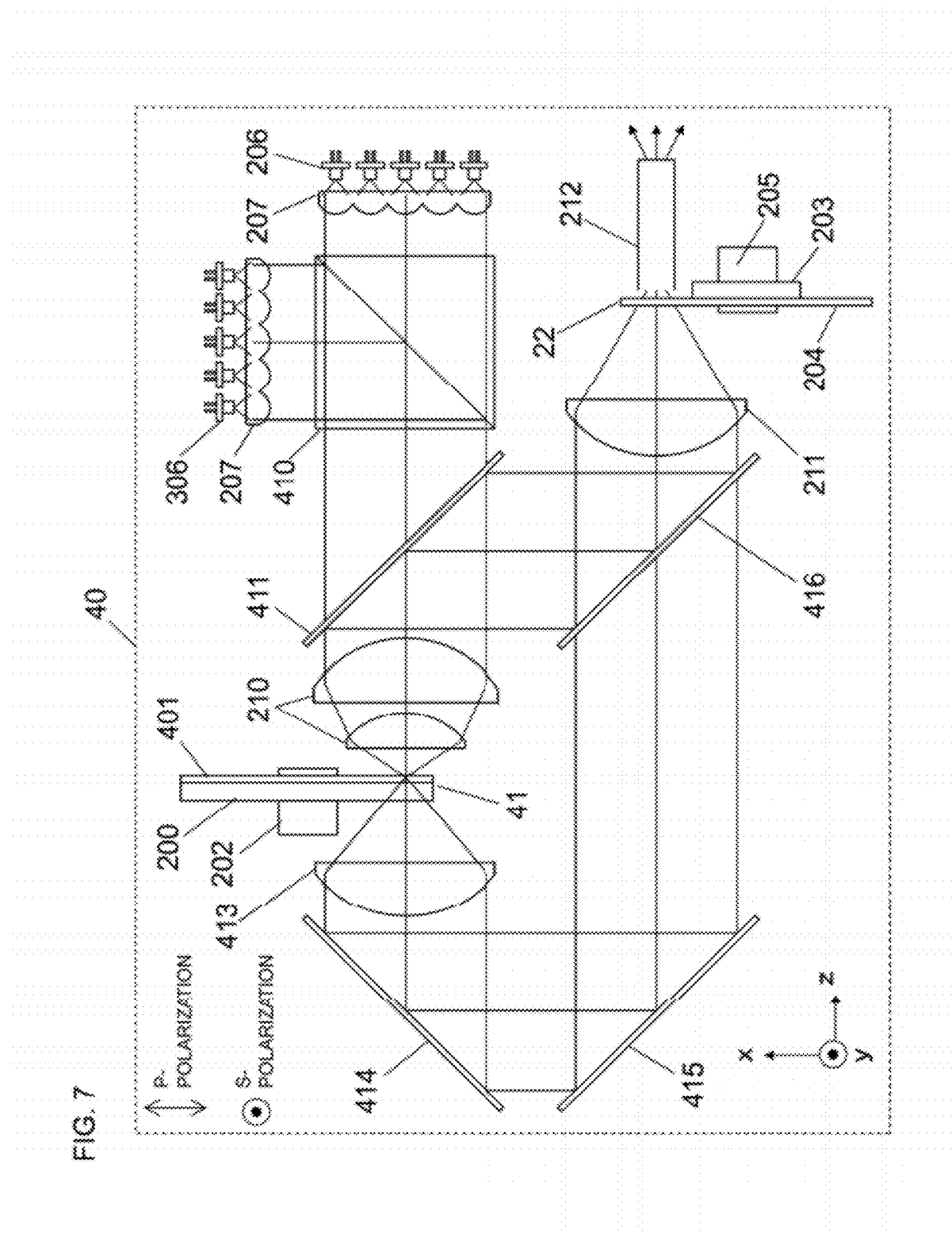
FIG. 7 is a structural diagram of a light source apparatus according to a third embodiment.

FIG. 7 shows the structure of a light source apparatus 40 according to a third embodiment of the present invention.

The light source apparatus 40 according to the third embodiment shown in FIG. 7 includes a first wheel 41, a second wheel 22, excitation light sources 206 and 306, two collimating lens arrays 207, a polarized beam splitter 410, dichroic mirrors 411 and 416, a collimating lens 413, reflecting mirrors 414 and 415, light collecting lenses 210 and 211, and a rod integrator 212. Similarly to the first and second embodiments, the light output from the light source apparatus 40 is formed of light that switches periodically among three time segments, namely red light, green light, and blue light, and the output light can be used as the illumination light of an image display apparatus or the like.

The light source apparatus 40 according to the third embodiment is different from the light source apparatus 20 according to the first embodiment described above in the first wheel 41, the polarized beam splitter 410, the dichroic mirrors 411 and 416, the collimating lens 413, and the reflecting mirrors 414 and 415. Further, in accordance with the properties of these different components, also the arrangement of some components of the light source apparatus 40 is different from that of the light source apparatus 20. It should be noted that in the light source apparatus 40, the same components as those of the light source apparatuses 20 and 30 are denoted by the same reference numerals, and are not redundantly described.

The first wheel 41 includes a substrate 200, a phosphor layer 401, and a rotation control section 202. Similarly to the first embodiment, the phosphor layer 401 provided on the first wheel 41 includes three segments, namely a red phosphor layer 2011, a green phosphor layer 2012, and a non-phosphor surface 2013. The phosphor layer 401, however, is different from the phosphor layer 201 according to the first embodiment in that the glass surface of the substrate 200 is coated with antireflection coating for the excitation light wavelength, only in the area corresponding to the segment of the non-phosphor surface 2013, instead of the dichroic coating having a high reflection in the visible region. That is, in the time domain (the blue segment) where the spot to be illuminated by the excitation light is present on the non-phosphor surface 2013, the excitation light passes through the glass substrate 200, and is made incident on the collimating lens 413 arranged behind the substrate 200.

In the third embodiment, the circular substrate 200 is formed of glass. Alternatively, the substrate 200 may have a structure that allows the excitation light to pass through a cavity formed by producing a hole only in the non-phosphor surface 2013 portion (used in the the blue segment), using a metal plate subjected to surface working so as to have a high reflection, instead of using glass.

The excitation light source employed in the third embodiment includes two modules, namely the excitation light source 206 according to the first embodiment and the excitation light source 306 according to the second embodiment. The entire light emitted from the 25 blue laser diodes included in the excitation light source 206 is adjusted to be P-polarized light; and the entire light emitted from the 25 blue laser diodes included in the excitation light source 306 is adjusted to be S-polarized light. The light emitted from each excitation light source module is spatially combined together by the polarized beam splitter 410, and then, the resulting light is made incident on the dichroic mirror 411.

The dichroic mirror 411 is arranged so as to be inclined 45 degrees with respect to the optical axis of the excitation light. In the excitation wavelength range, the dichroic mirror 411 has the property of having a high transmission regardless of whether whether P-polarized light or S-polarized light. In the fluorescence wavelength ranges, the dichroic mirror 411 has the property of having a high reflection regardless of whether P-polarized light or S-polarized light. Consequently, blue laser light, which is the excitation light, passes through the dichroic mirror 411.

The red phosphor layer 2011 and the green phosphor layer 2012 of the phosphor layer 401 are provided on dichroic coating having a high reflection in the visible region. Thus, in the time domains (the red segment and the green segment) where the excitation light illuminates these phosphor layers, the fluorescence from the phosphors is, similarly to the first embodiment, obtained on the back side, is collimated by the light collecting lens 210, is subsequently reflected by the dichroic mirror 411, and is made incident on the dichroic mirror 416.

Meanwhile, in the time domain (the blue segment) where the excitation light illuminates the non-phosphor surface 2013 of the phosphor layer 401, the excitation light passes through the first wheel 41, is collimated by the collimating lens 413, is reflected by the reflecting mirrors 414 and 415 to thereby change direction 180 degrees, and is made incident on the dichroic mirror 416.

The dichroic mirror 416 has approximately the same transmission spectrum characteristics as those of the dichroic mirror 411, that is, the property of having a high transmission in the excitation wavelength range and the property of having a high reflection in the fluorescence wavelength ranges. Thus, the light from the three segments is spatially combined into approximately the same luminous flux by the dichroic mirror 416, and the luminous flux is made incident on the light collecting lens 211. The light collected by the light collecting lens 211 passes through the dichroic filter 204, and is coupled to the rod integrator 212 to thereby serve as the light output from the light source apparatus 40.

The second wheel 22 is as described in the above embodiments. Blue laser light, however, is likely to cause speckle noise, and thus, it is desirable to form a structure where light is diffused in a path or a segment that transmits only blue laser light. In the structure shown in FIG. 7, for example, it is possible to form a diffusing surface by providing minute protrusions and depressions in the glass surface on the side of the blue selection filter 2043 of the second wheel 22 that is not coated with dichroic coating. It should be noted that the diffusion properties are not particularly limited so long as they do not reduce the efficiency of coupling to the rod integrator 212.

As described above, the employment of the structure according to the third embodiment makes it possible to obtain blue laser light and fluorescence by spatially combining them even when the directions of the polarization of the excitation light sources are not uniform. Further, the use of the second wheel 22 makes it possible to obtain output light having a high color purity and not containing unwanted light in each segment.

<Fourth Embodiment>

Figure 8:
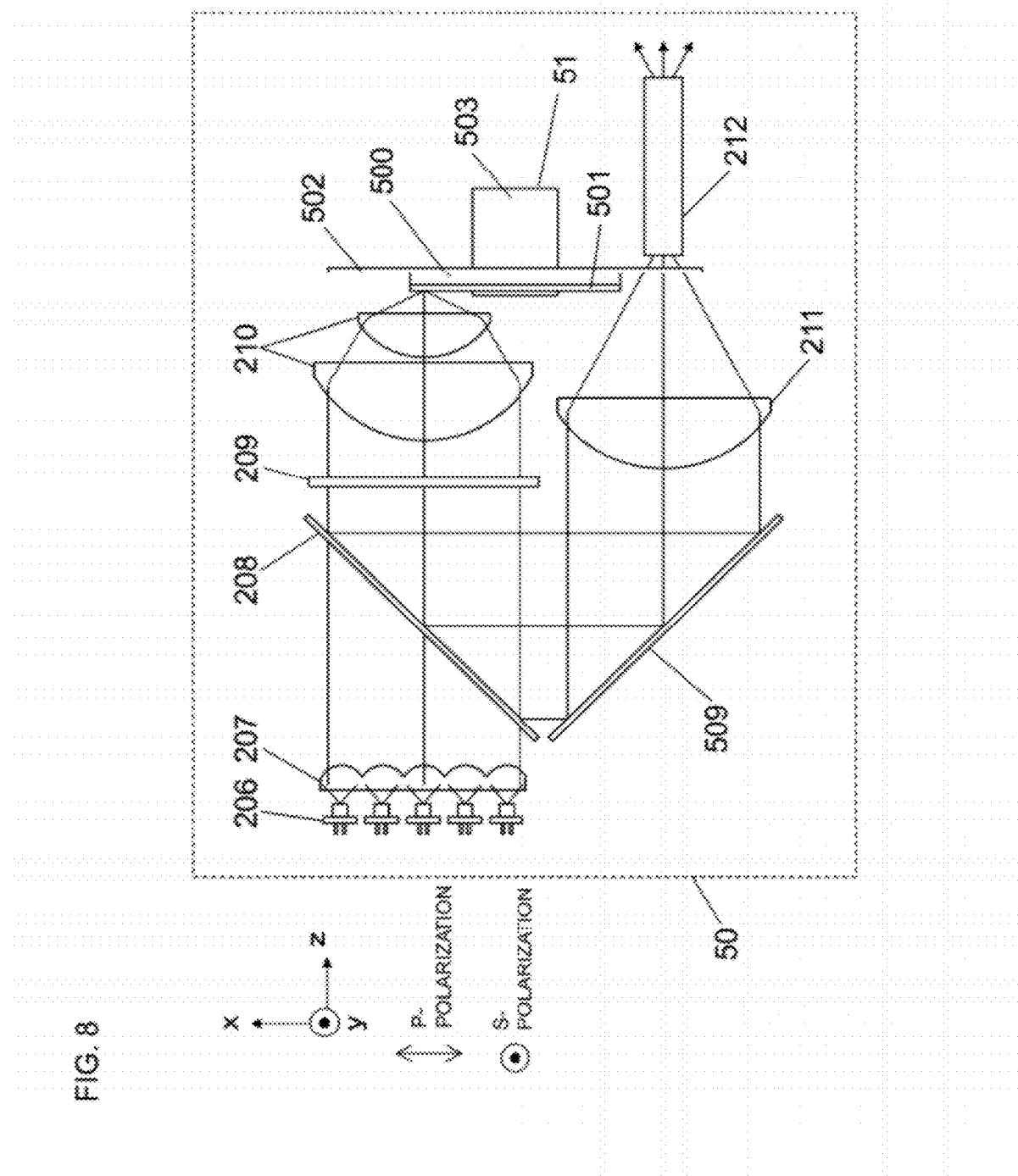
FIG. 8 is a structural diagram of a light source apparatus according to a fourth embodiment.

FIG. 8 shows the structure of a light source apparatus 50 according to a fourth embodiment of the present invention.

The light source apparatus 50 according to the fourth embodiment shown in FIG. 8 includes a wheel 51, an excitation light source 206, a collimating lens array 207, a dichroic mirror 208, a reflecting mirror 509, a quarter-wave plate 209, light collecting lenses 210 and 211, and a rod integrator 212. Similarly to the first embodiment, the light output from the light source apparatus 50 is formed of light that switches periodically among three time segments, namely red light, green light, and blue light, and the output light can be used as the illumination light of an image display apparatus or the like.

The light source apparatus 50 according to the fourth embodiment is different from the light source apparatus 20 according to the first embodiment described above in the wheel 51 and the reflecting mirror 509. Further, in accordance with the properties of these different components, the arrangement of some components of the light source apparatus 50 is different from that of the light source apparatus 20. It should be noted that in the light source apparatus 50, the same components as those of the light source apparatus 20 are denoted by the same reference numerals, and are not redundantly described.

Figure 9:
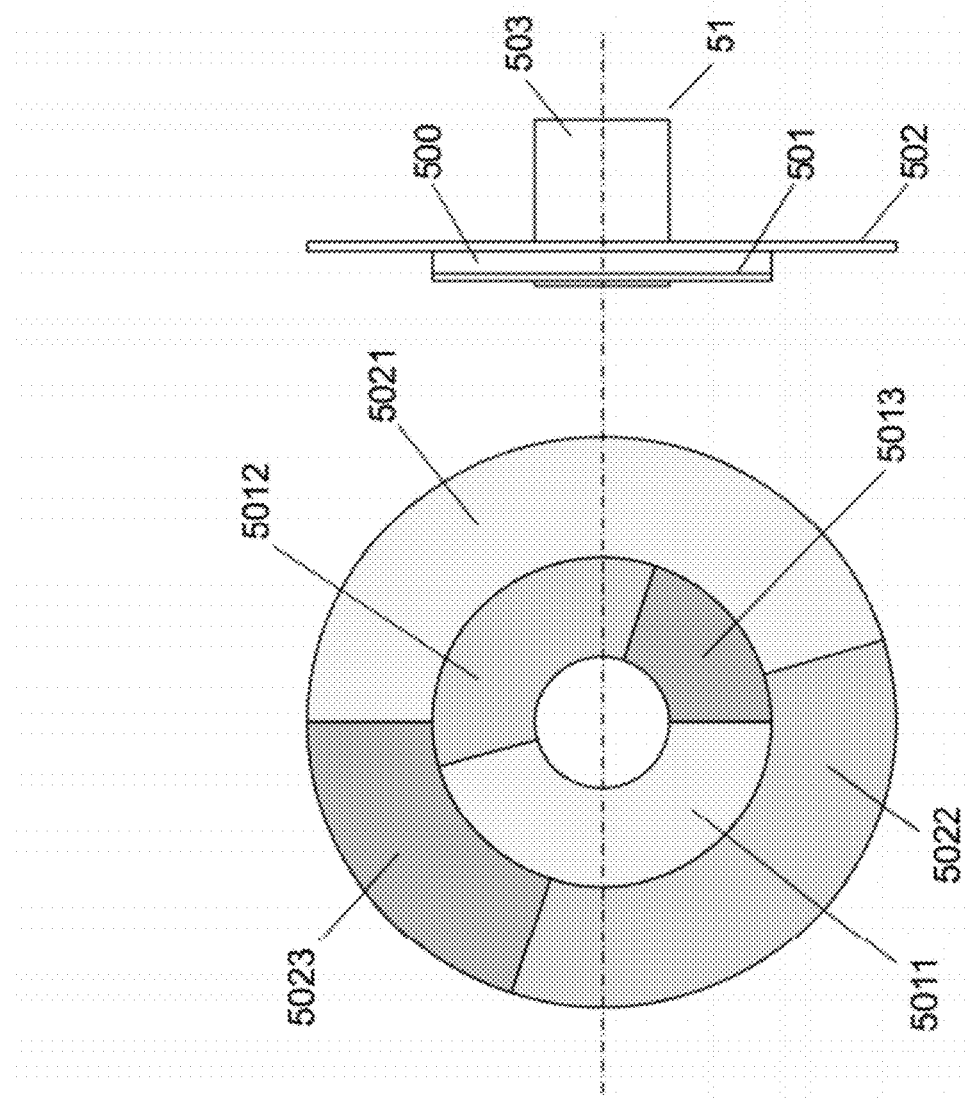
FIG. 9 is a structural diagram of a wheel used in the light source apparatus according to the fourth embodiment.

The wheel 51 includes a substrate 500 formed of a circular flat metal plate, a phosphor layer 501, a dichroic filter 502, and a rotation control section 503. The phosphor layer 501 is formed on the surface on one side of the substrate 500, and the dichroic filter 502 is formed on the surface on the other side. The wheel 51 has a structure where, simply put, the first wheel 21 and the second wheel 22 described in the above embodiments are provided about a concentric axis in overlap with each other, and are simultaneously rotated by one rotation control section. FIG. 9 shows an example of a specific segment structure of the wheel 51.

In the wheel 51 shown in FIG. 9, the phosphor layer 501 includes three segments, namely a red phosphor layer 5011 coated with a red phosphor, a green phosphor layer 5012 coated with a green phosphor, and a non-phosphor surface 5013 coated with nothing. The red phosphor and the green phosphor are applied to an area on the surface of the substrate 500, the area worked into a mirror surface, and the non-phosphor surface 5013 has a metal mirror surface. The materials of the red phosphor and the green phosphor are the same as those of the first embodiment.

The dichroic filter 502 has a structure where a circular transparent glass plate greater in circumference than the phosphor layer 501 is coated with dichroic coating. The dichroic filter 502 also includes three segments, namely a red selection filter 5021, a green selection filter 5022, and a blue selection filter 5023.

The red selection filter 5021 and the green selection filter 5022 have the properties shown in (a) and (b) of FIG. 3B. The blue selection filter 5023 is not a dichroic filter, which has a high reflection for green light and red light, but is a filter coated with antireflection coating so as to have a high transmission in the blue wavelength region. Further, the glass surface on the emitting side is not a flat surface but a diffusing surface formed by providing minute protrusions and depressions so as to diffuse light. In the present embodiment, the diffusion angle of the diffusing surface is about 3 degrees; however, the diffusion properties are not particularly limited so long as they do not reduce the efficiency of coupling to the rod integrator 212.

Similarly to the first embodiment, the layout of the segments is adjusted so that in the time domain (the red segment) where the excitation light illuminates the red phosphor layer 5011 in the phosphor layer 501, the light collected by the light collecting lens 211 passes through the red selection filter 5021 of the dichroic filter 502. Accordingly, the components for the red segment, namely the red phosphor layer 5011 and the red selection filter 5021, have the same angle of division relative to the entire 360-degree circumference, and are arranged symmetrically 180 degrees with respect to the rotating shaft of the wheel 51. The same is true of the components for the green segment and the blue segment.

Each of the red fluorescence, the green fluorescence, and the unconverted blue laser light that have been emitted from the phosphor layer 501 is reflected by the dichroic mirror 208, is further reflected by the reflecting mirror 509, and is made incident on the light collecting lens 211. The light collected by the light collecting lens 211 passes through the dichroic filter 502, and is coupled to the rod integrator 212 to thereby serve as the light output from the light source apparatus 50.

The use of the dichroic filter 502 results in removing unwanted residual excitation light in the red segment. In the green segment, unwanted residual excitation light is removed, and also, among the fluorescence emitted from the green phosphor, the spectral components having wavelengths longer than a wavelength of 600 nm are removed. In the blue segment, none of the spectral components changes; however, the light reduces speckle noise by passing through a rotating diffusion device.

As described above, the employment of the structure according to the fourth embodiment makes it possible to concentrate the functions achieved by two spatially separate wheels in the first embodiment on one rotating body. This makes it possible to provide a light source apparatus having high color rendering properties and a high-brightness by a simpler method.

<Fifth Embodiment>

A fifth embodiment is one where the phosphor layer 501 and the dichroic filter 502 formed on the wheel 51 of the light source apparatus 50 according to the fourth embodiment are replaced with a phosphor layer 601 and a dichroic filter 602, respectively. Consequently, the entire arrangement of a light source apparatus according to the fifth embodiment and the components other than the phosphor layer 601 and the dichroic filter 602 are the same as those of the light source apparatus 50 according to the fourth embodiment, and therefore are not described here.

Such a segment structure makes it possible to obtain, from the light source apparatus, output light that switches periodically among four colors, namely red light, green light, approximately white light, and blue light in the respective time segments.

Figure 10:
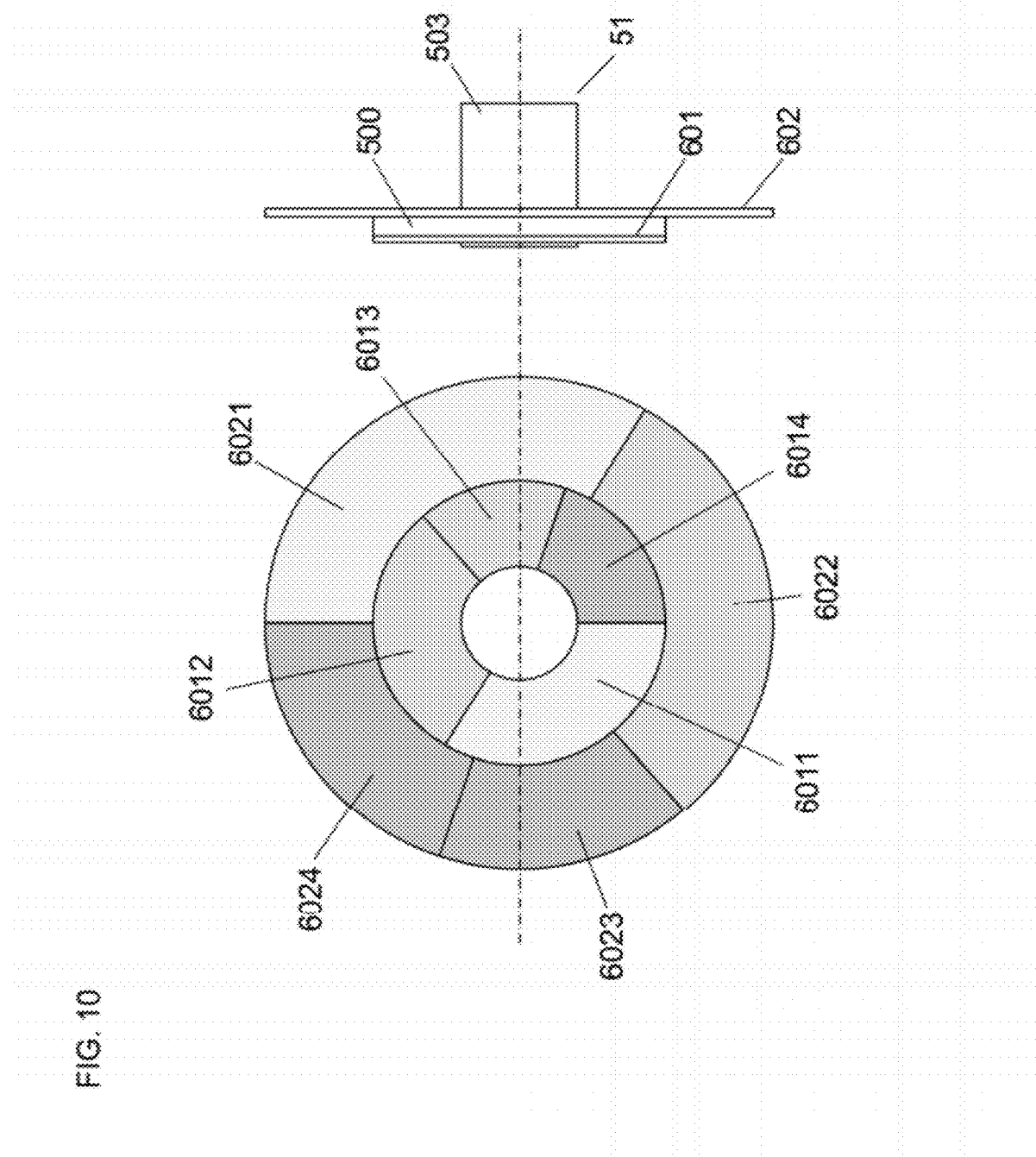
FIG. 10 is a structural diagram of a wheel used in a light source apparatus according to a fifth embodiment.

FIG. 10 shows an example of the structure of a wheel 61 according to the fifth embodiment.

The wheel 61 includes a substrate 500, a phosphor layer 601, a dichroic filter 602, and a rotation control section 503.

The phosphor layer 601 includes four segments, namely a red phosphor layer 6011 coated with a red phosphor, two green phosphor layers 6012 and 6013 coated with green phosphors, and a non-phosphor surface 6014 coated with nothing. In the present embodiment, the green phosphors applied to the two green phosphor layers 6012 and 6013 are the same material, but may be materials different in properties. The red phosphor and the green phosphors are applied to an area on the surface of the substrate 600, the area worked into a mirror surface, and the non-phosphor surface 6014 has a metal mirror surface. The materials of the red phosphor and the green phosphors are the same as those of the first embodiment.

The dichroic filter 602 has a structure where a circular transparent glass plate greater in circumference than the phosphor layer 601 is coated with dichroic coating. The dichroic filter 602 also includes four segments, namely a red selection filter 6021, a green selection filter 6022, an entire-visible-region high-transmission plate 6023, and a blue selection filter 6024.

The red selection filter 6021 and the green selection filter 6022 have the properties shown in (a) and (b) of FIG. 3B. The entire-visible-region high-transmission plate 6023 is a transparent glass plate coated on both sides with antireflection coating for the entire visible region. In the entire-visible-region high-transmission plate 6023, green fluorescence is converted to approximately white light when output. The blue selection filter 6024 is the same as the blue selection filter 5023 used in the fourth embodiment, and has a high transmission in the excitation wavelength range and has the function of diffusing light on its emitting side.

Similarly to the fourth embodiment, the layout of the segments is adjusted so that in the time domain (the red segment) where the excitation light illuminates the red phosphor layer 6011 in the phosphor layer 601, the light collected by the light collecting lens 211 passes through the red selection filter 6021 of the dichroic filter 602. That is, in the red segment where red light is output, the red phosphor layer 6011 and the red selection filter 6021 have the same angle of division relative to the entire 360-degree circumference, and are arranged symmetrically with respect to the rotating shaft of the wheel 61. Similarly, in the green segment where green light is output, the green phosphor layer 6012 and the green selection filter 6022 have the same angle and are arranged symmetrically. In the blue segment where blue light is output, the non-phosphor surface 6014 and the blue selection filter 6024 have the same angle and are arranged symmetrically.

Also in the segment newly added in the fifth embodiment (hereinafter referred to as a "white segment") where approximately white light is output, the components for the segment, namely the green phosphor layer 6013 and the entire-visible-region high-transmission plate 6023, have the same angle of division relative to the entire 360-degree circumference, and are arranged symmetrically with respect to the rotating shaft of the wheel 61.

In the white segment, no specific spectral components are removed from the light that is emitted from the green phosphor layer 6013 and reaches the rod integrator 212, whereby the entire light is coupled. Thus, the light contains also a part of unconverted residual excitation light and long-wavelength components of the green phosphors. This makes it possible to obtain output light brighter than that of the fourth embodiment, which includes three segments.

The chromaticity of approximately white light varies depending on the chromaticities and the wavelength conversion efficiencies of the green phosphors, and therefore may become bluish white or greenish white. In the case, however, where the light source apparatus is applied to an image display apparatus, the angles of division of the four segments and the intensity of the excitation light may be adjusted so that the total light output from the four segments has a desired chromaticity.

In the present embodiment, the angles of division are set such that: the red segment is assigned 120 degrees; the green segment is assigned 120 degrees; the white segment is assigned 60 degrees; and the blue segment is assigned 60 degrees. Alternatively, it is possible to appropriately set the distribution of angles on the basis of the wavelength conversion characteristics of the phosphors, the target chromaticity of the output light, or the like.

As described above, the employment of the structure according to the fifth embodiment makes it possible to make the white light obtained from the light source apparatus brighter without increasing the intensity of the excitation light. This structure is particularly suitable for use in an image display apparatus such as a projector.

<Example of Image Display Apparatus Using Light Source Apparatus According to the Present Invention>

Figure 11:
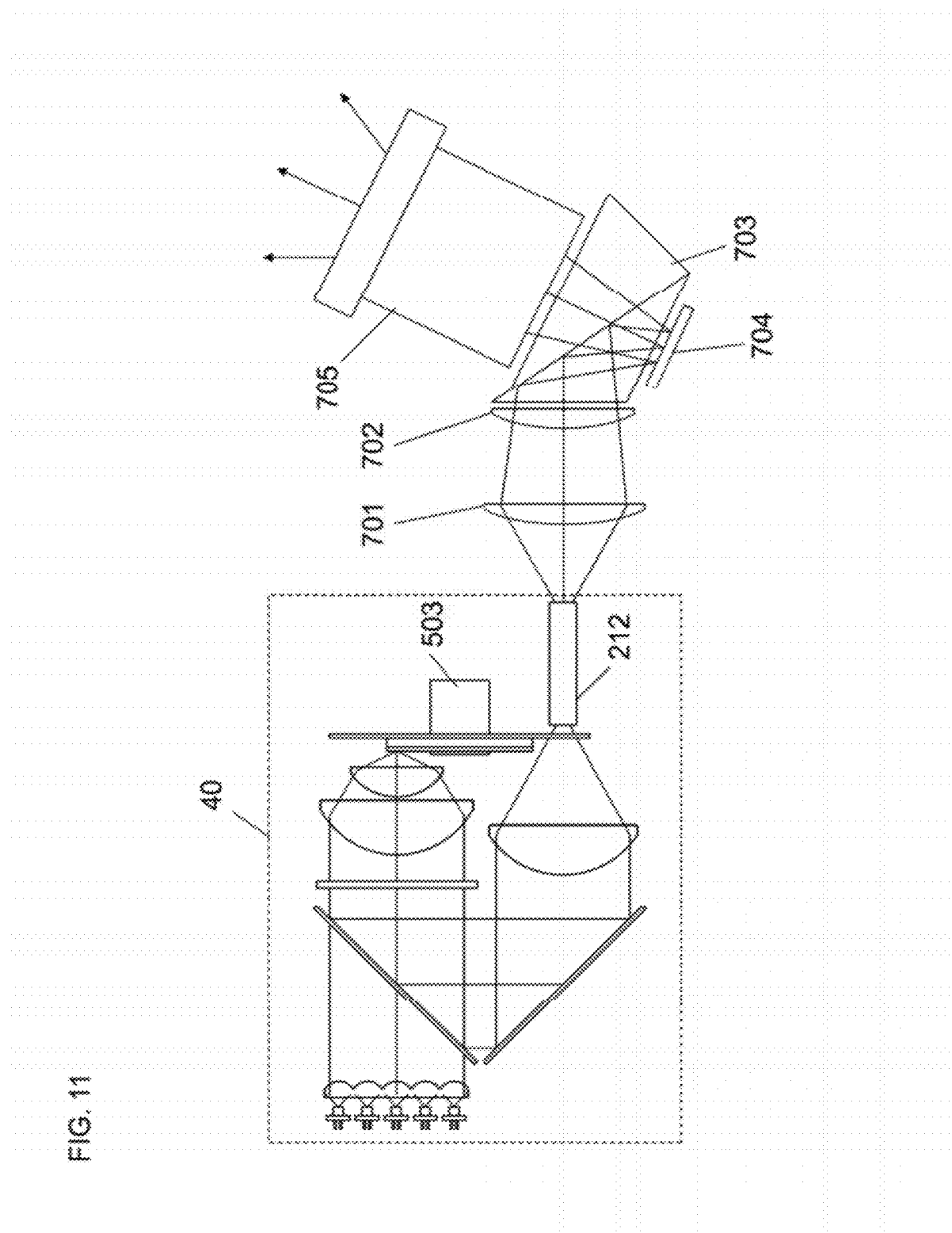
FIG. 11 is an example of an image display apparatus using a light source apparatus according to the present invention.

FIG. 11 shows an example of the structure of an image display apparatus using the light source apparatus 50 according to the fourth embodiment of the present invention. It should be noted that this example shows the image display apparatus using the light source apparatus 50 according to the fourth embodiment; however, the image display apparatus may also include the light source apparatus according to any of the other embodiments.

The illuminance of the light output from the rod integrator 212 of the light source apparatus 50 is made uniform by the emitting surface of the rod. Then, the light passes through a relay lens 701, a field lens 702, and a total reflection prism 703, and is made incident on a DMD 704, which is an image display device. A relay optical system has a structure where the shape of the light obtained at the emitting surface of the rod integrator 212 is transferred to the DMD 704, and the light is efficiently and uniformly collect the light.

The DMD 704 includes micromirrors arranged in a two-dimensional manner, each mirror forming time-modulated signal light by changing its inclination in accordance with a red, green, or blue image input signal. The timing of the rotation control section 503 is controlled such that while the DMD 704 is being driven by a red image signal, the excitation light illuminates the red phosphor layer 5011, and the light source apparatus 500 outputs red light from the red phosphor. Similarly, the timing of the rotation control section 503 is controlled such that: while the DMD 704 is being driven by a green image signal, the excitation light illuminates the green phosphor layer 5012; and while the DMD 704 is being driven by a blue image signal, the excitation light illuminates the non-phosphor surface 5013. The signal light modulated by the DMD 704 is projected by a projection lens 705 onto a screen not shown in the figures.

As described above, the structure of the image display apparatus using the light source apparatus according to the embodiments of the present invention makes it possible to provide a small and efficient image display apparatus.

While the invention has been described in detail, the foregoing description is in all aspects illustrative and not restrictive. It will be understood that numerous other modifications and variations can be devised without departing from the scope of the invention.

What is claimed is:

1. A light source apparatus comprising:
   an excitation light source including a laser light source;
   a first wheel that is controlled to rotate, includes a phosphor layer to be excited by excitation light emitted from the excitation light source, and reflects fluorescence emitted from the phosphor layer, in a direction from which the excitation light has been incident;
   a dichroic mirror that is provided between the first wheel and the excitation light source, and guides the fluorescence and the excitation light to an illumination optical system; and
   a second wheel that is controlled to rotate, is provided between the dichroic mirror and the illumination optical system, and includes a dichroic filter that guides light having a desired wavelength component of each of the fluorescence and the excitation light to the illumination optical system.

2. The light source apparatus according to claim 1, wherein the excitation light source is a semiconductor laser light source that oscillates in a blue wavelength region.

3. The light source apparatus according to claim 1, wherein the phosphor layer of the first wheel is divided into three or more segments.

4. The light source apparatus according to claim 3, wherein phosphor layers different from each other in type are provided in at least two of the segments.

5. The light source apparatus according to claim 4, wherein phosphors included in the phosphor layers each emit fluorescence having light in a red, yellow, or green wavelength range as a main component.

6. The light source apparatus according to claim 3, wherein no phosphor layer is provided in at least one of the segments, and the segment reflects the excitation light.

7. The light source apparatus according to claim 1, wherein a polarization conversion device is provided between the first wheel and the dichroic mirror, and changes a polarization direction of the excitation light.

8. The light source apparatus according to claim 7, wherein the polarization conversion device is a quarter-wave plate.

9. The light source apparatus according to claim 8, wherein the excitation light source emits excitation light having, as a main polarization component, P-polarized light with respect to the dichroic mirror; and
   the dichroic mirror transmits the excitation light from the excitation light source to thereby guide the excitation light to the first wheel, and reflects the light reflected by the first wheel to thereby guide the light to the illumination optical system.

10. The light source apparatus according to claim 8, wherein
    the excitation light source emits excitation light having, as a main polarization component, S-polarized light with respect to the dichroic mirror; and
    the dichroic mirror reflects the excitation light from the excitation light source to thereby guide the excitation light to the first wheel, and transmits the light reflected by the first wheel to thereby guide the light to the illumination optical system.

11. The light source apparatus according to claim 1, wherein
    in wavelengths of the excitation light, the dichroic mirror transmits 50% or greater of light having a P-polarization component, and reflects 50% or greater of light having an S-polarization component.

12. The light source apparatus according to claim 11, wherein
    the excitation light source emits excitation light having, as a main polarization component, P-polarized light with respect to the dichroic mirror; and
    the dichroic mirror transmits the excitation light to thereby guide the excitation light to the first wheel.

13. The light source apparatus according to claim 11, wherein
    the excitation light source emits excitation light having, as a main polarization component, S-polarized light with respect to the dichroic mirror; and
    the dichroic mirror reflects the excitation light to thereby guide the excitation light to the first wheel.

14. The light source apparatus according to claim 1, wherein
    the dichroic filter of the second wheel is divided into two or more segments; and
    the two or more segments are different from each other in spectrum characteristics.

15. The light source apparatus according to claim 14, wherein
    the spectrum characteristics include any of a red selectivity, a green selectivity, a blue selectivity, and entire-visible-region transmission properties.

16. The light source apparatus according to claim 14, wherein
    at least one of the two or more segments of the second wheel has a function of diffusing the excitation light.

17. The light source apparatus according to claim 1, wherein
the first wheel and the second wheel are synchronously controlled with the same number of rotations.

18. The light source apparatus according to claim 1, wherein
the first wheel and the second wheel are provided on a rotating body having the same rotating shaft.

19. An image display apparatus comprising:
a light source apparatus that outputs light;
a spatial light modulation device that forms signal light in accordance with a video signal;
an illumination optical system that guides the light from the light source apparatus to the spatial light modulation device; and
a projection optical system that projects the signal light formed by the spatial light modulation device onto a screen,
the light source apparatus including:
an excitation light source including a laser light source;
a first wheel that is controlled to rotate, includes a phosphor layer to be excited by excitation light emitted from the excitation light source, and reflects fluorescence emitted from the phosphor layer, in a direction from which the excitation light has been incident;
a dichroic mirror that is provided between the first wheel and the excitation light source, and guides the fluorescence and the excitation light to an illumination optical system; and
a second wheel that is controlled to rotate, is provided between the dichroic mirror and the illumination optical system, and includes a dichroic filter that guides light having a desired wavelength component of each of the fluorescence and the excitation light to the illumination optical system.

* * * * *